(12) United States Patent
Leong et al.

(10) Patent No.: US 9,082,241 B2
(45) Date of Patent: Jul. 14, 2015

(54) WIRELESS COMMUNICATIONS CIRCUIT

(75) Inventors: Frank Leong, Eindhoven (NL); Jan van Sinderen, Liempde (NL); William Redman-White, Alton (GB)

(73) Assignee: NXP B.V., Eindhoven (NL)

( * ) Notice: Subject to any disclaimer, the term of this patent is extended or adjusted under 35 U.S.C. 154(b) by 382 days.

(21) Appl. No.: 13/344,838

(22) Filed: Jan. 6, 2012

(65) Prior Publication Data

US 2013/0176069 A1    Jul. 11, 2013

(51) Int. Cl.
*H04B 7/00*     (2006.01)
*G07C 9/00*     (2006.01)
*B60R 25/24*    (2013.01)

(52) U.S. Cl.
CPC .......... *G07C 9/00309* (2013.01); *B60R 25/24* (2013.01); *G07C 2009/0038* (2013.01); *G07C 2009/0096* (2013.01); *G07C 2009/00587* (2013.01); *G07C 2009/00793* (2013.01); *Y02B 60/50* (2013.01)

(58) Field of Classification Search
CPC ............... A61B 5/1116; A61B 5/1118; A61N 1/36535; A61N 1/08; A61N 1/3718; G01N 2021/1793; G05D 2201/0213; G06K 9/00791; G06K 9/00818; G06K 9/00825; G06K 19/0723; G06K 7/0008; G06K 19/07767; G06K 19/07792; G07C 2009/0038; G07C 2009/0096; G07C 9/00309; Y02B 60/50; H04W 52/0229; H04W 4/008; H04W 84/20; B60R 2325/105; B60R 25/00; B60R 25/20; B60R 25/24; B60R 25/406; G08B 13/248; H01Q 1/3241; H04B 1/03

USPC .......... 455/507, 41.1, 41.2, 334, 9.92, 569.2, 455/345, 343.3, 351–353; 340/426.16, 340/426.36, 5.6, 5.61–5.67, 5.7, 5.71–5.74, 340/10.33, 10.52, 442, 447, 426.13, 10.1
See application file for complete search history.

(56) References Cited

U.S. PATENT DOCUMENTS

| | | | | |
|---|---|---|---|---|
| 6,747,545 B2 * | 6/2004 | Nowottnick et al. | ........ | 340/5.61 |
| 7,113,083 B2 * | 9/2006 | Suitsu | .......... | 340/442 |
| 8,135,536 B2 * | 3/2012 | Matsunaga et al. | .......... | 345/441 |
| 8,373,581 B2 * | 2/2013 | Hassan et al. | ................ | 340/992 |
| 8,401,589 B2 * | 3/2013 | Liu et al. | .................... | 455/552.1 |

(Continued)

FOREIGN PATENT DOCUMENTS

CN     101136561 A     3/2008
EP     0 343 619 A2    11/1989

(Continued)

OTHER PUBLICATIONS

Extended European Search Report for European Patent Appln. No. 13150043.1 (Apr. 23, 2013)xx.
Brown et al., Harvesting a Clock from a GSM Signal for the Wake-Up of a Wireless Sensor Network, IEEE, pp. 1500-1503, 2010.

(Continued)

*Primary Examiner* — Sujatha Sharma

(57) ABSTRACT

In accordance with one or more example embodiments, wireless communications are facilitated based on user-motion. A portable motion-sensing circuit, carried by a user, indicates that motion is sensed in response to detecting whether the user has been moving for a predetermined period of time. A communication circuit operates in active mode and inactive modes respectively consuming higher and lower power, permits or inhibits access authentication communications in the active and inactive modes, and operates in the active mode in response to the motion being sensed at the motion-sensing circuit.

22 Claims, 6 Drawing Sheets

(56) References Cited

U.S. PATENT DOCUMENTS

| | | | |
|---|---|---|---|
| 8,463,332 B2 | 6/2013 | Sato et al. | |
| 8,531,268 B2* | 9/2013 | Ghabra et al. | 340/5.61 |
| 2005/0099263 A1* | 5/2005 | Ikeda | 340/5.62 |
| 2006/0094350 A1* | 5/2006 | Ishimura et al. | 455/9 |
| 2008/0058029 A1 | 3/2008 | Sato et al. | |
| 2008/0109164 A1 | 5/2008 | Matsunaga et al. | |
| 2008/0290990 A1 | 11/2008 | Schaffzin et al. | |
| 2010/0204877 A1* | 8/2010 | Schwartz | 701/33 |
| 2012/0153894 A1* | 6/2012 | Widmer | 320/108 |
| 2012/0252365 A1* | 10/2012 | Lam | 455/41.2 |

FOREIGN PATENT DOCUMENTS

| | | |
|---|---|---|
| EP | 0 808 971 A2 | 11/1997 |
| EP | 0 984 124 A2 | 3/2000 |
| EP | 1 447 775 A2 | 8/2004 |
| FR | 2 786 802 A1 | 6/2000 |

OTHER PUBLICATIONS

Che-Chang Yang et al., A Review of Accelerometry-Based Wearable Motion Detectors for Physical Activity Monitoring, Sensors 2010, 10, pp. 7772-7788, 2010.

* cited by examiner

WIRELESS COMMUNICATIONS CIRCUIT

In many wireless communications systems, transponders and base stations communicate with one another to effect a variety of communications. For example, transponders can be used in automotive applications for passive keyless entry (PKE) for activating an unlocking mechanism to unlock the doors of a vehicle, or passive keyless go (PKG) for activating an ignition-type circuit for starting an engine or otherwise activating a drive system in a vehicle. Generally, the transponders communicate with base stations that are located in the vehicle, and the base stations communicate with other circuits in the vehicle to carry out the aforesaid functions. The communications between the transponder and base station can be unidirectional or bidirectional, depending on the protocol.

Unfortunately, such communications systems may be limited in their application and function due to power use constraints. Moreover, circuits that require significant power may be unusable in a variety of applications, such as those involving the use of battery power, due to high power requirements. For example, many systems require certain circuits to be actively powered in order to operate as a passive access circuit, such as for responding to a polling signal generated at a regular interval, in order to establish base station-transponder communications. This can require sub-threshold circuit operation, and limit the complexity and function of circuit configurations therein. These and other matters have presented challenges to the design and implementation of communications systems for a variety of applications.

Various example embodiments are directed to wireless communications, and to addressing various challenges including those discussed above.

According to an example embodiment, an apparatus includes a portable motion-sensing circuit and a communication circuit communicatively coupled to the motion-sensing circuit. The motion-sensing circuit configured and arranged to be carried by a user and indicates that motion is sensed in response to detecting user movement (e.g., whether the user has been moving for a predetermined period of time). The communication circuit operates in an active mode in response to the motion being sensed at the motion-sensing circuit, and an inactive mode in which the communication circuit is consuming less power relative to power consumed by the communication circuit in the active mode. In the active mode, access authentication communications are permitted with the communication circuit, and access authentication communications with the communication circuit are inhibited in the inactive mode.

Another example embodiment is directed to a communications apparatus including a base station and a transponder circuit. The base station operates in an active mode and in an inactive mode in which the base station inhibits authentication communications and consumes less power relative to power consumed by the base station in the active mode. The transponder circuit can be carried by a user, and includes a communication circuit and a motion-sensing circuit that senses motion indicative of movement of the user. The communication circuit communicates wirelessly with the base station in response to the sensed motion to provide a wake-up signal to the base station, with the base station being responsive to the wake-up signal by operating in the active mode. The communication circuit also communicates wirelessly with the base station to provide an access authentication communication to the base station for authenticating the remote transponder.

Another example embodiment is directed to a method for communicating. In a portable motion-sensing device, an indication that motion is sensed is provided in response to detecting whether a user has been moving for a predetermined period of time. In response to the sensed motion, a wireless communication circuit is operated in an active mode in which access authentication communications with the communication circuit are permitted. The communication circuit is operated in an inactive mode. in which the communication circuit is consuming less power relative to power consumed by the communication circuit in the active mode, and in which access authentication communications with the communication circuit are inhibited. The inactive mode may be effected, for example, after a period of non-motion, non-walking motion, or prior to operating in the active mode.

The above discussion is not intended to describe each embodiment or every implementation of the present disclosure. The figures and following description also exemplify various embodiments.

Various example embodiments may be more completely understood in consideration of the following detailed description in connection with the accompanying drawings, in which.

Figure 1:
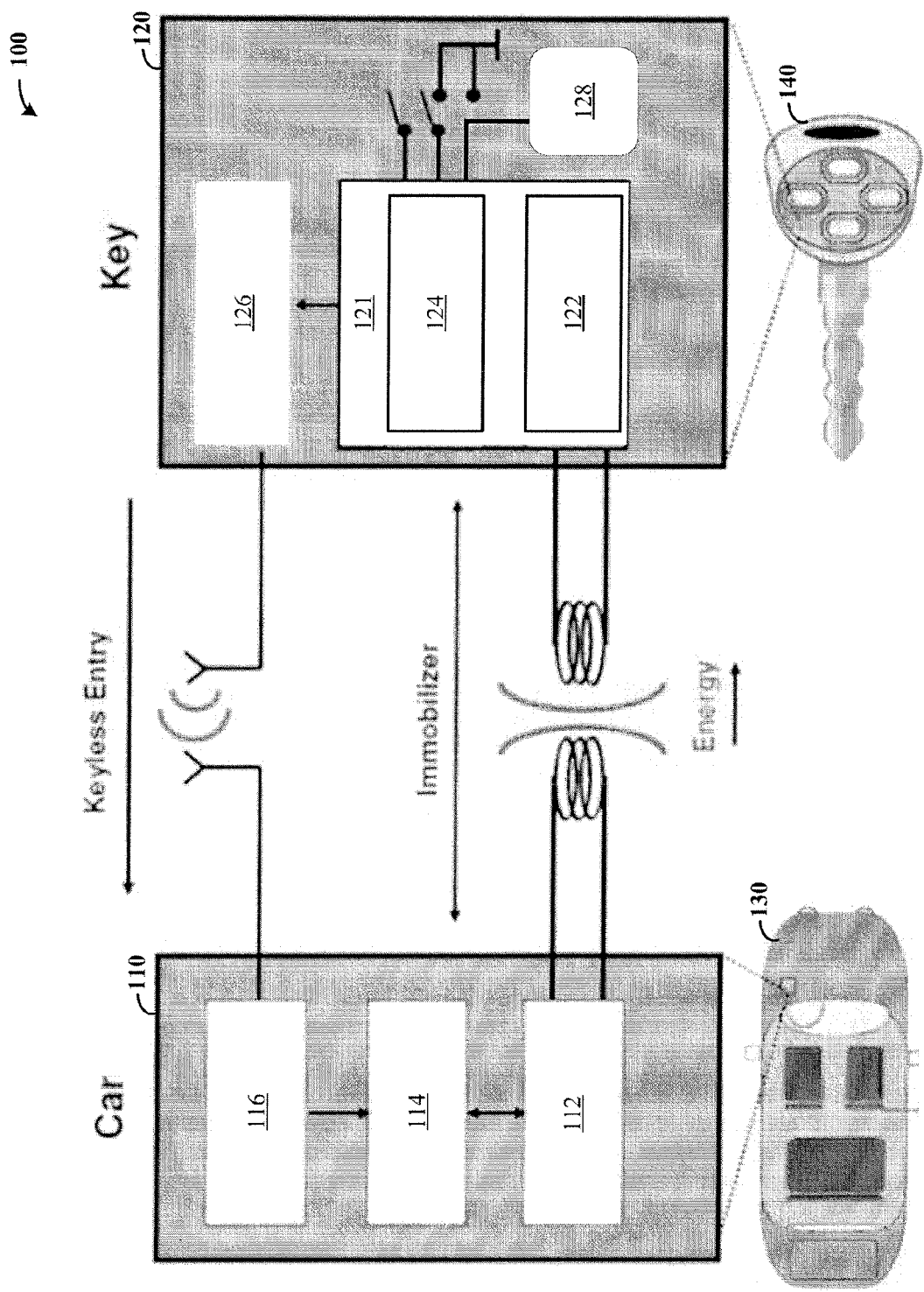
FIG. 1 shows communications circuits and a communications system, in accordance with one or more example embodiments of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined in the claims.

The present invention is believed to be applicable to a variety of different types of circuits, devices and systems for and/or involving wireless communications and/or security-based access. While the present invention is not necessarily limited in this context, various aspects of the invention may be appreciated through a discussion of related examples.

In accordance with various example embodiments, an apparatus/method involves a portable motion-sensing circuit, which can be carried by a user, and which indicates that motion is sensed in response to detecting whether the user has been moving (e.g., for a predetermined period of time). A communication circuit operates in an active mode and an inactive mode, and consumes less power in the in active mode relative to power consumed in the active mode. The communication circuit operates in the active mode based upon the motion sensed at the motion-sensing circuit and permits access authentication communications in the active mode. In the inactive mode, the communication circuit inhibits such access authentication communications.

In some implementations, the communication circuit is co-located with the portable motion-sensing circuit and communicatively coupled to the motion-sensing circuit via a wired link (e.g., the circuits may be located on a common integrated circuit). In other implementations, the communication circuit is remote from the portable motion-sensing circuit and communicatively coupled to the motion-sensing circuit via a wireless communication channel. In still other implementations, the communications circuit includes a first circuit co-located with the motion sensing circuit, and a second remote circuit that is connected with the first circuit via a wireless communication link.

In another example embodiment, a controller is connected to the communication circuit and operates to, in the inactive mode, control the communication circuit in a low-power state in which wireless access authentication communications with a remote transponder are inhibited, and in the active mode, control the communication circuit in a high-power state in which the access authentication communications are facilitated.

In some implementations, the communication circuit includes a low-frequency communication circuit and a high-frequency communication circuit. The communication circuit enters the active mode by powering the high-frequency communication circuit to send a wake-up signal to activate a circuit in a remote base station, in response to motion detected at the motion-sensing circuit. The communication circuit further communicates wirelessly between a base station and a remote transponder by using the low-frequency circuit to detect a response from the base station to the wake-up signal, identify the base station based upon the detected response, and communicate access authentication communication to the base station based on the identification.

In certain embodiments in which the communication circuit is integrated with the portable motion-sensing circuit, the communication circuit includes a low-frequency communication circuit and enters the active mode by powering the low-frequency communication circuit in response to motion detected at the motion-sensing circuit, and by using the low-frequency communication circuit to detect a polling signal from a remote base station. The remote base station is identified based upon the polling signal, and an access authentication communication is communicated to the base station based on the identification.

In some implementations, the communication circuit enters the inactive mode in response to a motion condition indicating a lack of motion for a predefined time period, and a state of communications between the communication circuit and a remote base station. For example, the state of communications may involve the passing of an active entry sequence in which an authentication communication is transmitted from a remote transponder to a base station, or after a successful vehicle drive activation sequence (e.g., starting an automobile).

Another example embodiment is directed to a communications apparatus having a base station and a transponder. The base station operates in an active mode and in an inactive mode in which the base station inhibits authentication communications and consumes less power, relative to power consumed by the base station in the active mode. The transponder can be carried by a user and includes a communication circuit and a motion-sensing circuit that senses motion indicative of movement of the user. The communication circuit communicates wirelessly with the base station to provide a wake-up signal to the base station in response to the sensed motion, and to provide an access authentication communication to the base station for authenticating the remote transponder. The base station is responsive to the wake-up signal by operating in the active mode.

In some implementations, the base station includes a high-frequency communication circuit and that operates in the inactive mode by polling for a high-frequency signal from the transponder. The transponder communicates a high-frequency wake-up signal to the base station in response to the sensed motion, and the base station responds to the wake-up signal by powering a low-frequency communication circuit and communicating authentication communications with the transponder via the low-frequency circuit, for authenticating the transponder to the base station. In some implementations, the base station further provides user access to a vehicle in response to authenticating the transponder, such as by unlocking the vehicle for user access, or permitting engagement of a drive system.

Turning now to the Figures, FIG. 1 shows communications circuits arranged in a communications system 100, in accordance with one or more example embodiments. The circuits shown in FIG. 1 may be implemented individually or as a system, for wireless communications. For example, the circuits may be implemented for a passive keyless entry (PKE) application to control access to a vehicle, or a passive keyless go (PKG) application to control the activation of a drive system (e.g., by permitting ignition access to start an engine, or permitting the activation of a drive system for a battery-powered vehicle). By way of example, aspects of FIG. 1 and the following description are made in the context of a PKE application, with the understanding that the circuits and/or system may be employed for PKG, a combination of PKE and PKG, or other approaches (e.g., for secure access to a building or premises).

A first communication circuit 110 includes a base station circuit 112, a control unit 114 and a UHF circuit 116. A second remote/mobile communication circuit 120 includes a transponder 122, a microcontroller 124, a UHF transmitter 126 and a motion sensor 128, with at least the transponder and microcontroller optionally included in a common circuit 121. The first communication circuit 110, which is shown by way of example as implemented in a vehicle 130, emits a low frequency alternating magnetic field carrying some data content. The second circuit 120, which is shown by way of example as implemented in a key 140, detects this field from some distance from the first communication circuit 110.

The motion sensor 128 is configured to generate an output based upon motion of the second circuit 120 (e.g., movement of the key 140). The second circuit 120 is responsive to the motion by entering an active mode, in which the microcontroller 124 controls the second communication circuit to operate in an active mode. In the active mode, the second circuit 120 operates for communicating signals with the first circuit 110, such as by operating the transmitter in a polling mode to communicate a polling signal to initiate communications with the first circuit 110. When the second circuit 120 receives a communication from the first circuit 110 when in the active mode, the second circuit generates and communicates an access signal, via the transmitter 126, to the first circuit for unlocking a door or doors in the vehicle 130.

The circuits shown in FIG. 1 may be operated in a variety of manners. In one implementation, when the motion sensor 128 senses motion, it provides a signal to the microcontroller 124, which operates to wake up the second circuit 120 for receiving data. The transponder 122 operates to receive a polling-type signal generated by the base station circuit 112, and sends a UHF signal via the UHF transmitter 126 in response. The control unit 114 operates in response to the signal received at the UHF circuit 116, to facilitate access to the vehicle 130. For example, the control unit 114 may decrypt or otherwise verify that the UHF response received from the UHF transmitter 126 is authentic. This approach may involve additional communications, such as an acknowledge communication from the second circuit 120, in response to which the first circuit 110 sends another communication to initiate verification. The communications may be effected via one or both of high frequency or low frequency links, and may involve use of the UHF circuit 116 as a transmitter.

In some implementations, the first circuit 110 powers the second circuit 120 via an RF signal that is transmitted from the base station circuit 112 to the transponder 122. When the first and second communication circuits 110 and 120 are in close proximity to one another, the transponder 122 receives wireless power via the radio frequency signal generated by the base station circuit 112. The second communication circuit 120 uses the wireless power to operate the microcontroller 124 and UHF transmitter 126, to communicate with the first circuit 110 via UHF circuit 116.

Accordingly, the second circuit 120 operates in a low power mode for initializing communications with the first circuit 110, based upon a motion-based characteristic of the motion sensor 128. For example, the second circuit 120 may switch to an active mode for initializing communications in response to an output indicating that motion has been detected (and to remain in the active mode for a predetermined time), or operate in an inactive mode after such a predetermined time and/or in the absence of motion. In such an inactive mode, virtually all the circuitry in the second circuit 120 can be shut down, while maintaining circuitry that can be used to wake-up the circuit (e.g., gating to awaken the circuit from sleep mode, start the clock generation and activate low-frequency detection at the transponder 122).

In this context, the second circuit 120 is maintained in an inactive mode based upon an output from the motion sensor. During this inactive mode, the second circuit 120 operates in a manner that is unresponsive to polling-type signals, such as those received from the first circuit 110, to save power and further to mitigate undesirable communications. While in the inactive mode, the second circuit 120 is unresponsive to signals corresponding to those from a base station type circuit 112 as shown in first circuit 110, such as those that may be received via a relay-type of circuit under an attack in which a signal from the base station circuit is mimicked or relayed to obtain unauthorized access to the vehicle 130.

In some implementations, the microcontroller 124 is configured to control the mode of the second circuit 120, based upon conditions that are in addition to and/or as an alternative to a condition of the motion sensor 128. In one embodiment, the microcontroller carries out spectral analysis of a signal corresponding to the motion detected at the motion sensor 128, to determine a type of motion. This approach can be used, for example, to differentiate between walking motion (e.g., in which the second circuit 120 is desirably activated) and vibration or a single bump. The microcontroller 124 may also operate to inhibit the motion sensor 128 in certain embodiments, such as when the second circuit 120 is in a car and a valid access sequence has been carried out at the second circuit as discussed above, but the car is stationary in traffic for an extended period of time. In other embodiments, the sleep mode is disabled so that the second circuit 120 is operable without requiring any subsequent motion-based wake-up, once in an active mode. In still other embodiments, the second circuit 120 operates in a mode that is set based upon a signal from the first circuit, such as a circuit indicative of the vehicle 130 successively entering an operational state (e.g., an engine has been started or otherwise enabled).

In a more particular example embodiment, the second circuit 120 operates to initiate communications with the first circuit, such as by using the UHF circuit 116. In this embodiment, the motion sensor 128 places the second circuit 120 in an active mode, in which the UHF circuit 116 generates a signal (e.g., in response to the motion sensor 128 detecting a walking motion). The first circuit 110 responds to the generated signal by carrying out communications to facilitate access to the vehicle 130. Using this approach, the base station circuit 112 can remain dormant (e.g., in a non-communicative mode) until a motion-initiated signal is generated by the second circuit 120. By maintaining the base station circuit 112 in a dormant state, power can be saved in the car, limiting the amount of time that the base station circuit needs to be activated.

A variety of different types of motion sensors and corresponding circuitry can be used in connection with the various embodiments as discussed herein, such as with the motion sensor circuit 128 shown in and described in connection with FIG. 1. For example, sensors that detect acceleration or a change in a local DC magnetic field direction can be used to activate the second circuit. Piezoelectric acceleration sensors, such as those used in acoustic instrumentation, can be used to generate voltage directly, which can be connected to other circuitry in the second circuit 120 (e.g., as part of a CMOS based key electronic system having a high impedance suitable for connection to such a sensor). For general information regarding motion sensing, and for specific information regarding motion sensing approaches that may be carried out in connection with one or more example embodiments as described herein, reference may be made to Che-Chang Yang and Yeh-Liang Hsu, "A Review of Accelerometry-Based Wearable Motion Detectors for Physical Activity Monitoring," *Sensors* 2010, 10, 7772-7788, which is fully incorporated herein by reference. Such approaches may involve, for example, distinguishing certain motion from walking motion, or distinguishing certain motion as a bump or physical motion not attributed with walking or other movement toward a vehicle.

The sensor operation can also be limited, such as may be relevant to a polling-type approach, in which the sensor is powered for sensing motion on a limited basis. In some implementations, a self-powered sensor is used, such as a sensor having an electrodynamic circuit including a moving magnet that induces an EMF in a coil to power the sensor for generating a motion-based wake-up signal to other circuitry. There inputs will, of course, need to have voltage limiting circuits to prevent damage in the event of a large transient signal due to the key suffering a large mechanical shock.

Figure 2:
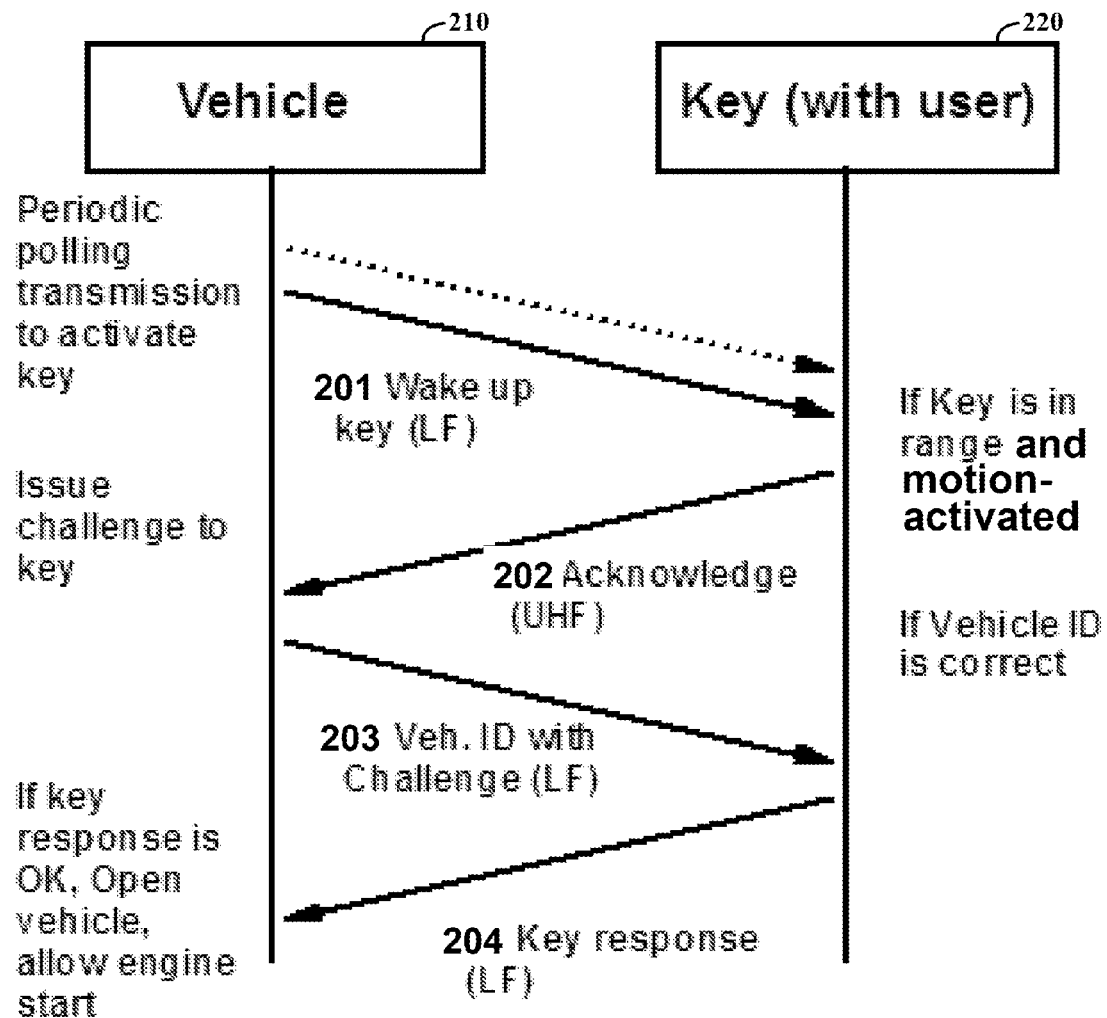
FIG. 2 is a signal diagram showing a communications approach for communicating between base and transponder circuits, in accordance with another example embodiment of the present invention.

Referring now to FIG. 2, a signal diagram 200 shows a communications approach for communicating between base and transponder circuits, respectively at a vehicle base station 210 and a key fob-type device 220, in accordance with another example embodiment of the present invention. At the base station 210, periodic polling transmissions 201, such as low-frequency wake-up communications, are generated and used to activate a key such as the key fob-type device 220. If the key device 220 is in range of the polling transmissions 201 and is also motion-activated (e.g., as discussed herein), the key device generates an acknowledge signal 202, such as a UHF signal. The base station 210 responds to the acknowledge signal by issuing a challenge to the key device 220, via a communication 203 (e.g., low frequency) including vehicle identification data for the base station, and challenge data. If the vehicle identification data is correct (e.g., matches data stored at the key device 220), the key device 220 processes the challenge date (e.g., security data) and returns a key response 204 (e.g., low frequency). The base station 210 uses the key response 204 to activate a circuit or otherwise grant access to a vehicle, such as by unlocking a door or enabling an engine/drive system.

Figure 3:
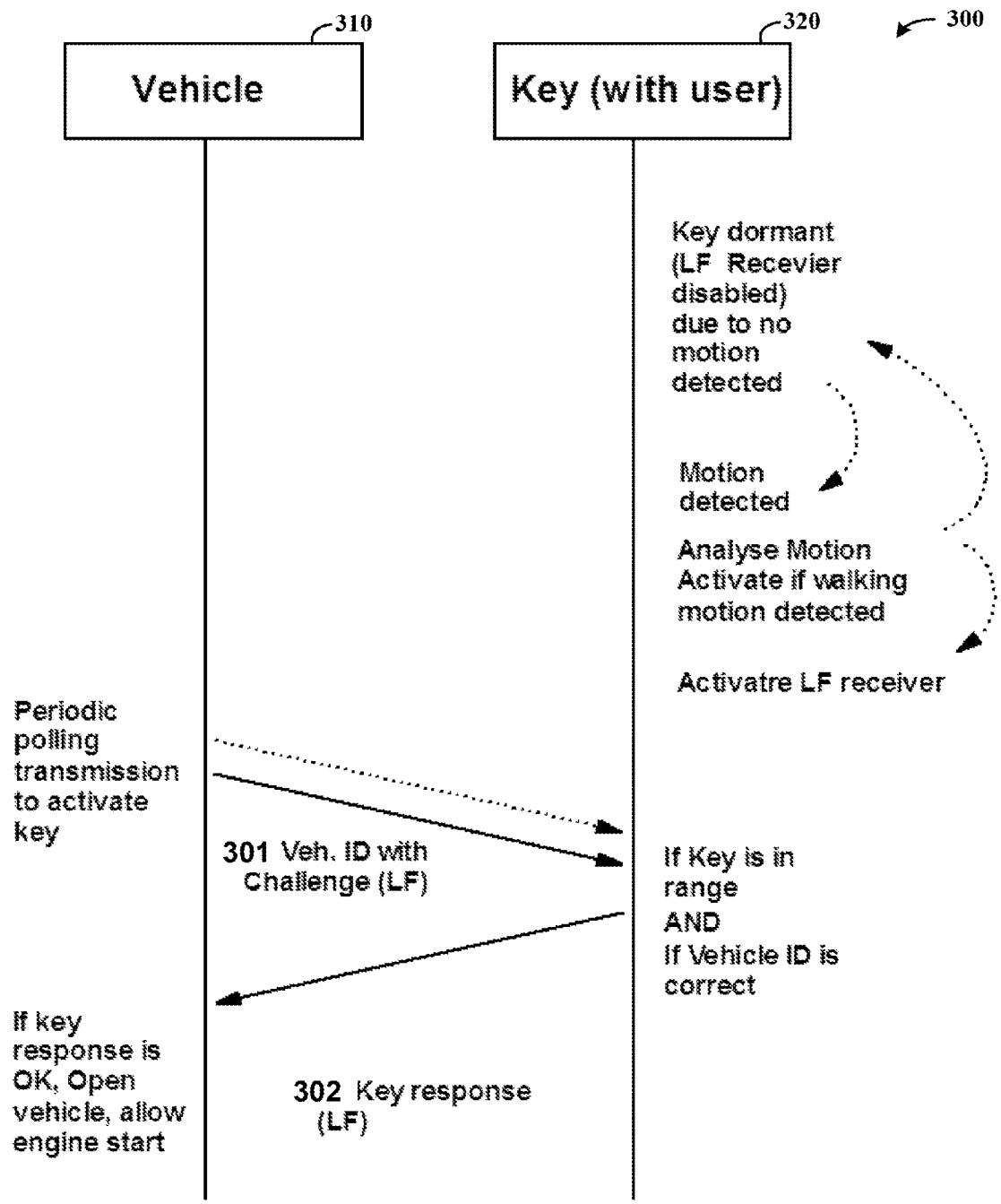
FIG. 3 is a signal diagram showing a communications approach for communicating between base and transponder circuits, in accordance with another example embodiment of the present invention.

FIG. 3 shows another signal diagram 300 for communicating between base and transponder circuits 310 and 320, in accordance with another example embodiment of the present invention. The transponder 320 includes a motion sensor and operates in a dormant, or low-power mode, when motion is not sensed. If motion is detected, the transponder 320 analyzes the motion to determine whether the motion type satisfies criteria, such as motion information pertaining to a user walking. If the motion analysis satisfies criteria, the transponder activates, such as by powering a low-frequency transceiver.

In the meantime, the base circuit 310 generates a polling signal 301 including vehicle identification data and challenge data, and transmits the signal (e.g., via low frequency). If the transponder circuit 320 is in the active state and within range of the poling signal 301, the transponder sends a response 302 (e.g., low frequency) that is processed by the base circuit 310 and authenticated to grant access to a vehicle.

Figure 4:
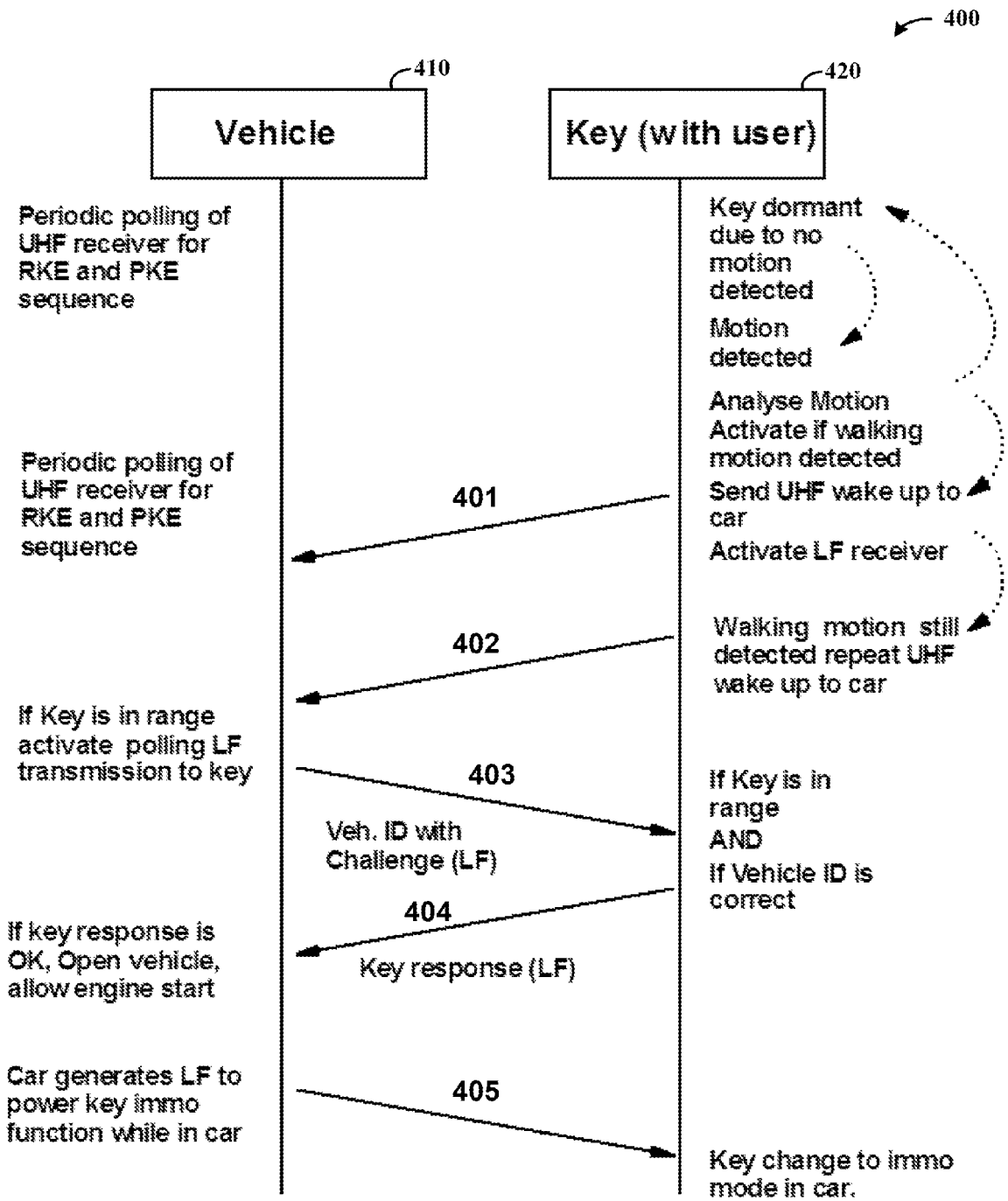
FIG. 4 is a signal diagram showing a communications approach for communicating between base and transponder circuits, in accordance with another example embodiment of the present invention.

FIG. 4 shows another signal diagram 400 for communicating between a base station 410 and a transponder 420, in accordance with another example embodiment of the present invention. As with FIG. 3, the transponder 420 remains in a dormant state when no motion is detected, and in response to detected motion, analyzes the motion to determine whether the motion meets a certain criteria. If the motion meets the criteria, the transponder 420 enters an active state and sends UHF communication 401 and 402 (upon continued detected motion).

The base station 410 polls for UHF communications, such as for remote keyless entry (RKE) and/or passive keyless entry (PKE) sequences. If the base station 410 detects the UHF communication (e.g., 401 or 402), it sends a low-frequency communication 403 including vehicle identification data and challenge data. The transponder 420 processes the low-frequency communication 403 and, if the vehicle ID is correct, generates a response to the challenge data and sends the response 404 to the base station 410. In turn, the base station grants access based on the response 404.

Figure 5:
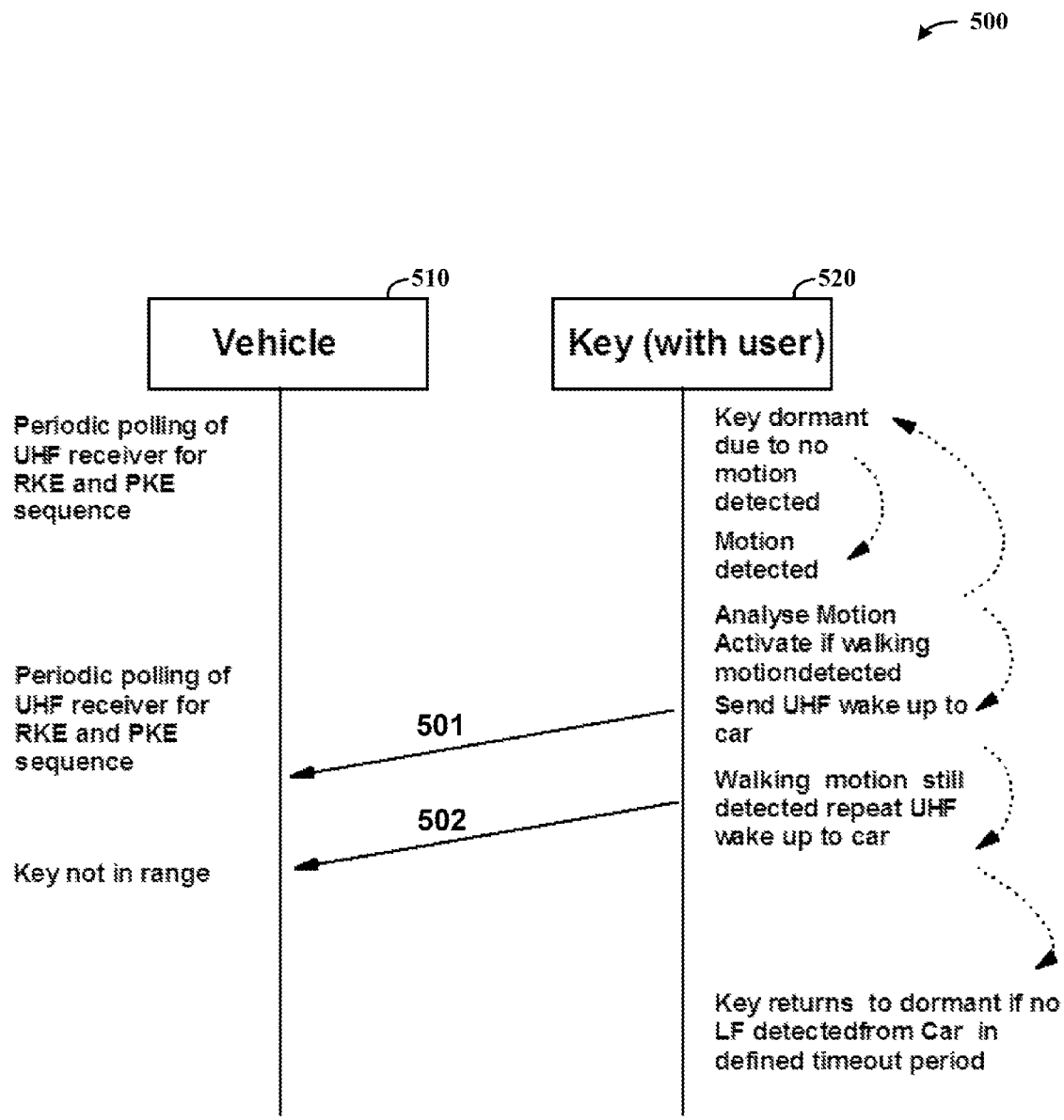
FIG. 5 is a signal diagram showing a communications approach for communicating between base and transponder circuits, in accordance with another example embodiment of the present invention.

FIG. 5 shows another signal diagram 500 for communicating between a base station 510 and transponder 520, in accordance with another example embodiment of the present invention. The signal diagram 500 may, for example, be implemented with the approach shown in FIG. 4, but in response to failing to detect a return signal from a base station and after a timeout period with respect to motion.

In this context, the transponder 520 remains in a dormant state when no motion is detected, and in response to detected motion, analyzes the motion to determine whether the motion meets a certain criteria. If the motion meets the criteria, the transponder 520 enters an active state and sends UHF communication 501 and 502 (upon continued detected motion). If no motion is detected and if no response is received from the base station 510, the transponder 520 enters a timeout mode. If the timeout mode lapses before receiving a response from the base station 510, the transponder 520 returns to the dormant state.

Figure 6:
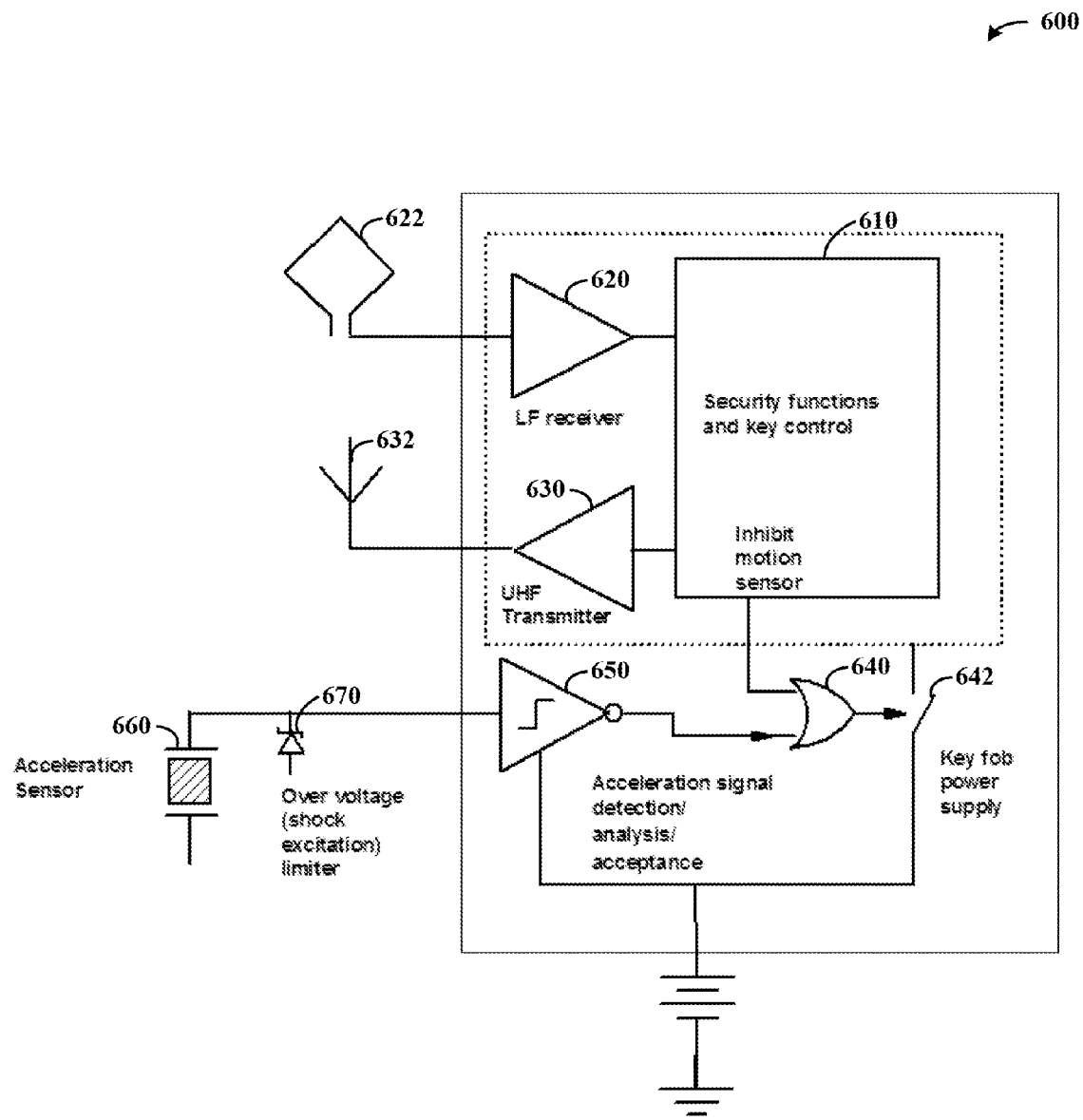
FIG. 6 is a transponder circuit, in accordance with another example embodiment of the present invention.

The approaches and systems as described herein can be carried out in one or more of a variety of manners and implemented using one or more of a variety of devices. FIG. 6 shows one such device, in a transponder 600, in accordance with another example embodiment of the present invention.

The transponder 600 may, for example, be implemented with the transponders shown in and/or described in connection with FIGS. 1-6.

The transponder 600 includes a security function and key control circuit 610, which is coupled to an LF receiver 620 and a UHF transmitter 630, respectively coupled to an LF antenna 622 and a UHF antenna 632. Via the LF receiver 620, the control circuit 610 receives low frequency communications from a base station. The control circuit 610 similarly transmits high frequency communications to the base station via the UHF transmitter 630.

The transponder 600 also includes switching circuitry 640 and 642, which is responsive to an acceleration signal detection/analysis circuit 650 and the processing of motion-based signals thereat. More specifically, the switching circuitry 640 and 642 functions to couple power to circuits in the transponder 600, as may be controlled by the control circuit 610 (e.g., to inhibit motion sensing).

In some implementations, the transponder 600 also includes motion-sensing circuits, including an acceleration sensor 660 and an over-voltage circuit 670 (e.g., a shock excitation limiter circuit). An output from these circuits is processed at the acceleration signal detection/analysis circuit 650, for determining the presence of motion and, if appropriate, analyzing the type of motion.

Based upon the above discussion and illustrations, those skilled in the art will readily recognize that various modifications and changes may be made to the present invention without strictly following the exemplary embodiments and applications illustrated and described herein. For example, various different types of sensors may be employed to effect motion sensing. In addition, different command sequences can be used at one or both of a base station and remote type circuit. Further, various circuits and approaches as discussed herein can be implemented with other approaches also discussed herein. For instance, approaches described in connection with vehicles can be used in connection with structures, such as businesses or residences, for granting access. Such modifications do not depart from the true spirit and scope of the present invention, including that set forth in the following claims. Furthermore, the term "example" as used throughout this document is by way of illustration, and not limitation.

What is claimed is:

1. An apparatus comprising:
   a portable motion-sensing circuit configured and arranged to be carried by a user and to indicate that motion is sensed in response to detecting whether the user has been moving for a predetermined period of time; and
   a communication circuit communicatively coupled to the motion-sensing circuit and configured and arranged to operate in an active mode and an inactive mode in which the communication circuit is consuming less power relative to power consumed by the communication circuit in the active mode, and in which wireless access authentication communications with the communication circuit are respectively permitted and inhibited in the active and inactive modes, wherein the communication circuit is configured and arranged to operate in the active mode in response to a spectral characteristic of the motion being sensed at the motion-sensing circuit and a type of motion indicated by the spectral characteristic, and to use the low-frequency communication circuit to detect a polling signal from a remote base station, and
   identify the remote base station based upon the polling signal.

2. The apparatus of claim 1, wherein the communication circuit is remote from the portable motion-sensing circuit and communicatively coupled to the motion-sensing circuit via a wireless communication channel, further including a controller circuit configured and arranged to in the inactive mode, control the communication circuit in a low-power state in which wireless access authentication communications with a remote transponder are inhibited, and switch operation from the inactive mode to the active mode in response to the spectral characteristic of the sensed motion being indicative of a walking motion, control the communication circuit in a high-power state in which the access authentication communications are facilitated.

3. An apparatus comprising:

a portable motion-sensing circuit configured and arranged to be carried by a user and to indicate that motion is sensed in response to detecting whether the user has been moving for a predetermined period of time; and a communication circuit communicatively coupled to the motion-sensing circuit and configured and arranged to operate in an active mode and an inactive mode in which the communication circuit is consuming less power relative to power consumed by the communication circuit in the active mode, and in which wireless access authentication communications with the communication circuit are respectively permitted and inhibited in the active and inactive modes, wherein the communication circuit is configured and arranged to operate in the active mode in response to a spectral characteristic of the motion being sensed at the motion-sensing circuit and a type of motion indicated by the spectral characteristic; wherein the communication circuit includes a low-frequency communication circuit and a high-frequency communication circuit, the communication circuit being configured and arranged to enter the active mode in response to the spectral characteristic of the sensed motion being indicative of a motion relative to a position of another object by powering the high-frequency communication circuit to send a wake-up signal to activate a circuit in a remote base station, in response to motion detected at the motion-sensing circuit, communicate wirelessly between the base station and a remote transponder by using the low-frequency circuit to detect a response from the base station to the wake-up signal, identify the base station based upon the detected response, and communicate access authentication communication to the base station based on the identification.

4. The apparatus of claim 1, wherein the communication circuit is configured and arranged to enter the active mode in response to the spectral characteristic of the motion sensed at the motion-sensing circuit by entering the active mode based upon a spectral characteristic of motion sensed by the motion-sensing circuit.

5. An apparatus comprising:

a portable motion-sensing circuit configured and arranged to be carried by a user and to indicate that motion is sensed in response to detecting whether the user has been moving for a predetermined period of time; and a communication circuit communicatively coupled to the motion-sensing circuit and configured and arranged to operate in an active mode and an inactive mode in which the communication circuit is consuming less power relative to power consumed by the communication circuit in the active mode, and in which wireless access authentication communications with the communication circuit are respectively permitted and inhibited in the active and inactive modes, wherein the communication circuit is configured and arranged to operate in the active mode in response to a spectral characteristic of the motion being sensed at the motion-sensing circuit and a type of motion indicated by the spectral characteristic; wherein the communication circuit is integrated with the portable motion-sensing circuit and includes a low-frequency communication circuit, the communication circuit being configured and arranged to enter the active mode by powering the low-frequency communication circuit in response to the spectral characteristic of the motion detected at the motion-sensing circuit, use the low-frequency communication circuit to detect a polling signal from a remote base station, and identify the remote base station based upon the polling signal, and communicate and access authentication communication to the base station based on the identification.

6. An apparatus comprising:

a portable motion-sensing circuit configured and arranged to be carried by a user and to indicate that motion is sensed in response to detecting whether the user has been moving for a predetermined period of time; and a communication circuit communicatively coupled to the motion-sensing circuit and configured and arranged to operate in an active mode and an inactive mode in which the communication circuit is consuming less power relative to power consumed by the communication circuit in the active mode, and in which wireless access authentication communications with the communication circuit are respectively permitted and inhibited in the active and inactive modes, wherein the communication circuit is configured and arranged to operate in the active mode in response to a spectral characteristic of the motion being sensed at the motion-sensing circuit and a type of motion indicated by the spectral characteristic; wherein the communication circuit includes a low-frequency circuit in a transponder that also includes the motion-sensing circuit, and is configured and arranged to receive radio-frequency (RF) power from a base station and to use the RF power to power the transponder for wirelessly communicating the authentication communications with the base station.

7. The apparatus of claim 1, wherein the motion-sensing circuit and the communication circuit are in a transponder including a power source, the transponder being configured and arranged to operate in the inactive mode for powering the motion-sensing circuit, and operate in the active mode for powering the transponder to communicate authentication communications with a remote base station.

8. The apparatus of claim 1, wherein the communication circuit is configured and arranged to, in the active mode, wirelessly communicate the access authentication communication to a remote base station in response to an authentication message from the base station.

9. The apparatus of claim 1, wherein the communication circuit is configured and arranged to respond to an authentication message from a base station by processing the authentication message to identify the base station, and provide the access authentication communications at the base station by wirelessly communicating the access authentication communications to the base station based upon the identification of the base station.

10. The apparatus of claim 1, wherein the communication circuit is configured and arranged to enter the inactive mode in response to a motion condition indicating a lack of motion for a predefined time period and a state of communications between the communication circuit and a remote base station.

11. The apparatus of claim 1, wherein the motion-sensing circuit is configured and arranged to generate a signal indicative of the spectral characteristic of the sensed motion using power generated via the signal, and the communication circuit is configured to operate in one of the active and inactive modes in response to the generated signal.

12. A communications apparatus comprising:
a base station configured and arranged to operate in an active mode and in an inactive mode in which the base station inhibits authentication communications and consumes less power relative to power consumed by the base station in the active mode; and
a transponder circuit configured and arranged to be carried by a user, the transponder circuit including a communication circuit and a motion-sensing circuit configured and arranged to sense motion indicative of movement of the user, the communication circuit being configured and arranged to communicate wirelessly with the base station to
in response to a spectral characteristic of the sensed motion, provide a wake-up signal to the base station, the base station being responsive to the wake-up signal by operating in the active mode,
use the low-frequency communication circuit to detect a polling signal from a remote base station,
identify the remote base station based upon the polling signal, and
provide an access authentication communication to the base station for authenticating the transponder.

13. The apparatus of claim 12, wherein the spectral characteristic of the sensed motion is indicative of the user moving relative to a position of the base station, and wherein
the base station includes a high-frequency communication circuit and is configured and arranged to operate in the inactive mode by operating the high-frequency communication circuit to poll for a high-frequency signal,
the transponder is configured and arranged to communicate a high-frequency wake-up signal to the base station in response to the spectral characteristic of the sensed motion,
the base station includes a low-frequency communication circuit and is configured and arranged to, in response to receiving the high-frequency wake-up signal, operate in the active mode by powering the low-frequency circuit, and
the base station and transponder are configured and arranged to wirelessly communicate authentication data between one another via the low-frequency circuit for authenticating the transponder to the base station.

14. The apparatus of claim 13, wherein the base station is configured and arranged to communicate over a vehicle communication circuit in a vehicle, in response to the authentication data, to provide user access to the vehicle for at least one of entry to the vehicle and engagement of a drive system in the vehicle.

15. The apparatus of claim 12, wherein the transponder circuit is configured and arranged to switch from a low-power mode to high-power mode in which more power is consumed than in the low-power mode, to provide the wake-up signal and the access authentication communication in the high-power mode, and to inhibit the wake-up signal and access authentication communication in the low-power mode.

16. The apparatus of claim 12, wherein the transponder circuit is configured and arranged to provide the wake-up signal based upon the spectral characteristic of motion sensed by the motion-sensing circuit being indicative of a spectral characteristic of walking motion.

17. A method for communicating, the method comprising:
in a portable motion-sensing device, providing an indication that motion is sensed in response to detecting a spectral characteristic of motion indicating whether a user has been moving for a predetermined period of time;
in response to the sensed motion, operating a wireless communication circuit in an active mode in which access authentication communications with the communication circuit are permitted; and
operating the communication circuit in inactive mode in which the communication circuit is consuming less power relative to power consumed by the communication circuit in the active mode, and in which access authentication communications with the communication circuit are inhibited, wherein the communication circuit is configured and arranged to
use the low-frequency communication circuit to detect a polling signal from a remote base station, and
identify the remote base station based upon the polling signal.

18. The method of claim 17, further including communicating a wake-up signal in response to the spectral characteristic of the sensed motion, and operating the wireless communication circuit in an active mode in response to the wake-up signal.

19. A method for communicating, comprising:
in a portable motion-sensing device, providing an indication that motion is sensed in response to detecting a spectral characteristic of motion indicating whether a user has been moving for a predetermined period of time;
in response to the sensed motion, operating a wireless communication circuit in an active mode in which access authentication communications with the communication circuit are permitted; and
operating the communication circuit in inactive mode in which the communication circuit is consuming less power relative to power consumed by the communication circuit in the active mode, and in which access authentication communications with the communication circuit are inhibited and including operating the communication circuit in the inactive mode includes powering a high-frequency circuit at a base station for polling for a high-frequency signal,
wherein the communication circuit is configured and arranged to enter the active mode in response to a spectral analysis identifying the spectral characteristic of the sensed motion being indicative of the user walking,
further including communicating a high-frequency wake-up signal from a remote transponder to the base station in response to the sensed motion,
further including, in response to the high-frequency wake-up signal, operating the base station in the active mode by wirelessly communicating authentication data between the base station and the transponder via a low-frequency circuit for authenticating the transponder to the base station.

20. The method of claim 19, wherein the sensed motion is indicative of the user moving relative to a position of the base station, and further including, at the base station, communicating over a vehicle communication circuit in a vehicle, in response to the authentication data, to provide user access to the vehicle for at least one of entry to the vehicle and engagement of a drive system in the vehicle.

21. The apparatus of claim 1, wherein the portable motion-sensing circuit is further configured and arranged to detect motion by:
   distinguishing the spectral characteristic of the detected motion relative to a walking motion of a user, and
   in response to the motion being sensed by the motion-sensing circuit by distinguishing the sensed motion, changing operation of the communication circuit from the inactive mode the active mode.

22. The apparatus of claim 1, wherein the communication circuit is configured and arranged to enter the active mode in response to a spectral analysis identifying the spectral characteristic of the sensed motion being indicative of a user walking.

* * * * *